US008366212B2

(12) United States Patent
Maeda et al.

(10) Patent No.: US 8,366,212 B2
(45) Date of Patent: Feb. 5, 2013

(54) CRAWLER-TYPE TRAVEL DEVICE AND ROTATIONAL WHEEL ASSEMBLY

(75) Inventors: Kazuo Maeda, Takatsuki (JP); Masatake Tamaru, Tokyo (JP)

(73) Assignee: Komatsu Ltd., Tokyo (JP)

( * ) Notice: Subject to any disclaimer, the term of this patent is extended or adjusted under 35 U.S.C. 154(b) by 344 days.

(21) Appl. No.: 12/810,339

(22) PCT Filed: Jan. 16, 2009

(86) PCT No.: PCT/JP2009/050562
§ 371 (c)(1),
(2), (4) Date: Jun. 24, 2010

(87) PCT Pub. No.: WO2009/101836
PCT Pub. Date: Aug. 20, 2009

(65) Prior Publication Data
US 2010/0270856 A1 Oct. 28, 2010

(30) Foreign Application Priority Data
Feb. 13, 2008 (JP) .................................. 2008-032103

(51) Int. Cl.
*B62D 55/14* (2006.01)
(52) U.S. Cl. ...................................... 305/136; 305/142
(58) Field of Classification Search .......... 305/136–137, 305/140, 142, 187, 193, 198, 200–201
See application file for complete search history.

(56) References Cited

U.S. PATENT DOCUMENTS

| 4,890,892 | A | | 1/1990 | Haslett |
| 5,288,143 | A | | 2/1994 | Dester et al. |
| 5,312,176 | A | * | 5/1994 | Crabb ........................... 305/124 |
| 5,803,558 | A | * | 9/1998 | Ketting et al. ................. 305/136 |
| 6,086,169 | A | * | 7/2000 | Keehner ........................ 305/137 |
| 6,206,492 | B1 | * | 3/2001 | Moser ........................... 305/194 |
| 6,299,264 | B1 | * | 10/2001 | Kautsch et al. ................ 305/137 |
| 7,237,853 | B2 | * | 7/2007 | Yamamoto et al. ............ 305/136 |
| 2004/0084961 | A1 | * | 5/2004 | Yamamoto et al. ............ 305/136 |

FOREIGN PATENT DOCUMENTS

| JP | 1-98784 U | 7/1989 |
| JP | 4-500789 A | 2/1992 |
| JP | 8-505338 A | 6/1996 |
| JP | 2004-149111 A | 5/2004 |
| JP | 2006-89023 A | 4/2006 |

* cited by examiner

*Primary Examiner* — Jason Bellinger
(74) *Attorney, Agent, or Firm* — Global IP Counselors

(57) ABSTRACT

The crawler-type travel device includes a plurality of shoe plates, a first link section, a rotational wheel, and a shaft. The rotational wheel includes a first roller and a second roller. The first roller makes contact with first end portions corresponding to axial outer ends of the first link members forming the first link section. The second roller is aligned with and disposed on the axial inner side of the first roller. The second roller is rotatable independently from the first roller. The second roller makes contact with second end portions corresponding to axial inner ends of the first link members.

5 Claims, 7 Drawing Sheets (54)

CRAWLER-TYPE TRAVEL DEVICE AND ROTATIONAL WHEEL ASSEMBLY

CROSS-REFERENCE TO RELATED APPLICATIONS

This national phase application claims priority to Japanese Patent Application No. 2008-032103 filed on Feb. 13, 2008. The entire disclosures of Japanese Patent Application No. 2008-032103 are hereby incorporated herein by reference.

TECHNICAL FIELD

The present invention relates to a crawler-type travel device and a rotational wheel assembly.

BACKGROUND ART

The crawler-type travel devices generally include components such as a crawler belt, a sprocket wheel, an idler tumbler, and top and bottom rotational wheels. In the crawler-type travel devices, driving force is delivered to the crawler belt from a driving source (e.g., engine) through the sprocket wheel. The crawler belt is thus driven and a vehicle is accordingly allowed to move.

FIG. 4 illustrates an example of the crawler-type travel devices. A pair of the crawler-type travel devices 1 is mounted to the transverse lateral sides of a vehicle body (not illustrated in the figure), respectively. A vehicle, including the vehicle body and the crawler-type devices 1, is allowed to move in response to driving of a pair of crawler belts 2. More specifically, each of the crawler-type travel devices 1 includes a track frame 3, an idler tumbler 4, a sprocket wheel 5, plural bottom rotational wheels 6, plural top rotational wheels 10, and the crawler belt 2.

The track frame 3 is disposed on either of the transverse lateral sides (i.e., right side or left side) of the vehicle body. The track frame 3 is a component for attaching the idler tumbler 4, the bottom rotational wheels 6, and the top rotational wheels 10 thereto. The idler tumbler 4 is disposed away from the sprocket wheel 5 in a longitudinal direction (i.e., front-to-rear direction). The idler tumbler 4 is mounted to the track frame 3 in a rotatable state. The idler tumbler 4 is configured to be rotated in conjunction with driving of the crawler belt 2. The sprocket wheel 5 is driven and rotated by driving force delivered from a driving source (e.g., engine). The bottom rotational wheels 6 are disposed on the bottom part of the track frame 3 while being disposed between the sprocket wheel 5 and the idler tumbler 4 in the longitudinal direction. The bottom rotational wheels 6 are mounted to the track frame 3 while being rotatable and pivotable up and down. The bottom rotational wheels 6 are configured to be rotated in conjunction with driving of the crawler belt 2. The top rotational wheels 10 are disposed on the top part of the track frame 3 while being rotatable with respect to the track frame 3. The top rotational wheels 10 are configured to be rotated in conjunction with driving of the crawler belt 2.

Each of the crawler belts 2 is an endless loop belt wound around the sprocket wheel 5, the idler tumbler 4, the bottom rotational wheels 6, and the top rotational wheels 10. As illustrated in FIG. 5, the crawler belt 2 includes plural shoe plates 7, a first link section 8, and a second link section 9. The shoe plates 7 are coupled in an endless-looped shape by the first link section 8 and the second link section 9.

The first link section 8 is composed of plural first link members 11. Each of the first link members 11 is fixed to each of the shoe plates 7. The first link members 11 are coupled to each other in order to couple the shoe plates 7 to each other. The second link section 9 has the same structure as the first link section 8. The second link section 9 is composed of plural second link members 12. The second link section 9 is separated from the first link section 8 in a direction parallel to the axial direction of components such as the sprocket wheel 5 and the bottom rotational wheels 6 (hereinafter simply referred to as "axial direction").

FIG. 6a and 6b illustrate a plan view and a side view of the link members. Specifically, FIG. 6a illustrates a plan view of the first link members 11 and the second link members 12, whereas FIG. 6b illustrates a side view of the first link members 11. The surfaces of the first link members 11, illustrated in FIG. 6a, are opposed to the surfaces thereof to be attached to the shoe plates 7. A part of the surfaces, hereinafter referred to as "rail surface R", makes contact with the idler tumbler 4, the bottom rotational wheels 6, and the top rotational wheels 10. Each of the first link members 11 includes a first end portion 13, a second end portion 14, and an intermediate portion 15. The first end portion 13 is one end of the first link member 11, and includes a pin hole 16. The pin hole 16 passes through the first link member 11 in the axial direction. A coupler pin 17 (see FIG.5) described below is press-fitted into the pin hole 16. The second end portion 14 is the other end of the first link member 11, and includes a bushing hole 18. The bushing hole 18 passes through the first link member 11 in the axial direction. A bushing 19 (see FIG.5) described below is press-fitted into the bushing hole 18. The intermediate portion 15 is positioned between the first end portion 13 and the second end portion 14.

Thickness of the first end portion 13 in the axial direction (i.e., vertical direction of FIG.6a) is less than that of the intermediate portion 15 in the axial direction. In a plan view, an axially outer lateral surface (hereinafter referred to as "outer lateral surface") 13a of the first end portion 13 and an outer lateral surface 15a of the intermediate portion 15 are included in roughly the same plane. On the other hand, an axially inner lateral surface (hereinafter referred to as "inner lateral surface") 13b of the first end portion 13 is recessed from an inner lateral surface 15b of the intermediate portion 15 in an axial outward direction. Further, a stepped portion 15c is formed between the inner lateral surface 13b of the first end portion 13 and the inner lateral surface 15b of the intermediate portion 15.

In a plan view, an inner lateral surface 14b of the second end portion 14 and the inner lateral surface 15b of the intermediate portion 15 are included in roughly the same plane. On the other hand, an outer lateral surface 14a of the second end portion 14 is recessed from the outer lateral surface 15a of the intermediate portion 15 in an axial inward direction. Further, a stepped portion 15d is formed between the outer lateral surface 14a of the second end portion 14 and the outer lateral surface 15a of the intermediate portion 15.

The first link section 8 is formed by coupling the first link members 11 in such a way that the first end portion 13 of each of the first link members 11 is overlapped with and coupled to the second end portion 14 of one of two adjacent first link members 11.

The second link members 12 have basically the same structures as those of the first link members 11 excluding the second link members 12 are symmetrical to the first link members 11. As illustrated in FIG. 5, each of the second link members 12 includes a third end portion 23, a fourth end portion 24, and an intermediate portion 25. The third end portion 23 is one end of each of the second link members 12, and corresponds to the first end portion 13. The third end portion 23 includes a pin hole 16. The fourth end portion 24 is the other end of each of the second link members 12, and corresponds to the second end portion 14. The fourth end portion 24 includes a bushing hole 18. The intermediate portion 25 is positioned between the third end portion 23 and the fourth end portion 24.

With the structure illustrated in FIG. 5, coupling of the first link members 11, coupling of the second link members 12, and coupling between the first link members 11 and the second link members 12 are achieved. Specifically, the bushings 19 are inserted and fixed into the bushing holes 18 of the first link members 11 and the bushing holes 18 of the second link members 12 by means of press-fitting. Further, the coupler pins 17 are inserted into the bushings 19, respectively. One end of the coupler pin 17 is inserted and fixed into the pin hole 16 of the first end portion 13 positioned on the outside of the second end portion 14 by means of press-fitting. On the other hand, the other end of the coupler pin 17 is inserted and fixed into the pin hole 16 of the third end portion 23 positioned on the outside of the fourth end portion 24 by means of press-fitting. The first link members 11 are coupled to each other in a rotatable state with the foregoing coupling structure. This is true to the second link members 12.

Patent Document 1: Japan Laid-Open Patent Application Publication No. JP-A-2006-89023

SUMMARY

As illustrated in FIG. 8, in the foregoing crawler-type travel device 1, each of the bottom rotational wheels 6 makes contact with the rail surfaces R of the first link section 8 and that of the second link section 9. Therefore, the rail surfaces R of the first link section 8 and those of the second link section 9 are worn away by repletion of travelling. Especially, the amount of abrasion is relatively greater in some part of the rail surface R than the rest of each of the rail surface R. Accordingly, each of the link members 11, 12 is axially recessed in the part, having relatively large amount of abrasion, of the rail surface R. Consequently, the rail surfaces R of the link members 11, 12 are deformed in a wave shape in a longitudinal direction (i.e., left-to-right direction in FIG.6b). The wave-shaped rail surfaces R cause vibration during traveling and an operator of the vehicle thereby feels uncomfortable. To deal with it, it is necessary to exchange the link members 11, 12 when their rail surfaces R are markedly recessed. In other words, component duration of the link members 11, 12 are shortened by the wave-shaped non-uniform abrasion.

The aforementioned non-uniform abrasion in the link members 11, 12 is caused when the bottom rotational wheels 6 make contact with the link members 11, 12 without rotating on a predetermined part of the rail surfaces R in driving of the crawler belt 2. Specifically, recesses tend to be produced in a portion 21 of the first end portion 13, which is close to the intermediate portion 15, and a portion 22 of the second end portion 14, which is close to the intermediate portion 15, as illustrated in FIG.6a.

The present invention addresses a need to produce a crawler-type travel device and a rotational wheel assembly for reducing non-uniform abrasion of the rail surface of a link member.

A crawler-type travel device according to a first aspect of the present invention includes a plurality of shoe plates, a first link section, a rotational wheel, and a shaft. The first link section couples the shoe plates in an endless loop shape. The rotational wheel is configured to be rotated in conjunction with movement of the first link section while making contact with the first link section. The shaft has an inner axial end and an outer axial end, and supports the rotational wheel while allowing the rotational wheel to rotate with respect to the shaft. The first link section includes a plurality of first link members. The first link members are respectively attached to the shoe plates. The first link members are coupled to each other at end portions thereof while the end portions are overlapped when viewed in the axial direction of the shaft. The rotational wheel includes a first roller and a second roller. The first roller makes contact with a first end portion of the first link section. The first end portion corresponds to an outer side part of the overlapped portions of the first link members in the axial direction. The second roller is aligned with and disposed on an inner side of the first roller in the axial direction. The second roller is configured and arranged to rotate independently from the first roller. The second roller makes contact with a second end portion of the first link section. The second end portion corresponds to an inner side part of the overlapped end portions of the first link members in the axial direction while the second end portion being overlapped with the first end portion when viewed in the axial direction.

In the crawler-type travel device of the first aspect of the present invention, the first and second rollers of the rotational wheel are aligned and disposed in the axial direction. The first and second rollers are also allowed to rotate independently from each other. Further, the first roller makes contact with the first end portion of each of the first link members. On the other hand, the second roller makes contact with the second end portion of each of the first link members. Therefore, when the first and second rollers make contact with the first and second end portions, respectively, it is possible to inhibit abrasion in the abutment parts by rotations of the first and second rollers. Consequently, the crawler-type travel device can reduce non-uniform abrasion on the rail surfaces of the link members.

A crawler-type travel device according to a second aspect of the present invention relates to the crawler-type travel device according to the first aspect of the present invention. The crawler-type travel device further includes a second link section. The second link section is inwardly spaced apart from the first link section in the axial direction. The second link section includes a plurality of second link members. The second link members are respectively attached to the shoe plates. The second link members are coupled to each other at end portions thereof while the end portions are overlapped when viewed in the axial direction of the shaft. The rotational wheel further includes a third roller, a fourth roller, and a spacer. The third roller makes contact with a third end portion of the second link section. The third end portion corresponds to an inner side part of the overlapped end portions of the second link members in the axial direction. The fourth roller is aligned with and disposed on an outer side of the third roller in the axial direction. The fourth roller is configured and arranged to rotate independently from the third roller. The fourth roller makes contact with a fourth end portion of the second link section. The fourth end portion corresponds to an outer side part of the overlapped end portions of the second link members in the axial direction while the fourth end portion being overlapped with the third end portion when viewed in the axial direction. The spacer is disposed between the second roller and the fourth roller in the axial direction. The spacer is configured and arranged to rotate independently from the second roller and the fourth roller.

According to the crawler-type travel device of the second aspect of the present invention, the first to fourth rollers and the spacer are disposed while being allowed to rotate independently from each other. Therefore, when the first to fourth rollers make contact with the first to fourth end portions, it is possible to inhibit abrasion in the abutment parts.

A crawler-type travel device according to a third aspect of the present invention relates to the crawler-type travel device according to the first aspect of the present invention. The crawler-type travel device further includes a second link member. The second link section is inwardly spaced apart from the first link section in the axial direction. The second link section includes a plurality of second link members. The second link members are respectively attached to the shoe plates. The second link members are coupled to each other at end portions thereof while the end portions are overlapped when viewed in the axial direction of the shaft. The rotational wheel further includes a third roller. The third roller makes contact with a third end portion of the second link section. The third end portion corresponds to an inner side part of the overlapped end portions of the second link members in the axial direction. Further, the second roller includes a first roller portion, a second roller portion, and a spacer portion. The first roller portion is aligned with and disposed on an inner side of the first roller in the axial direction. The first roller portion makes contact with the second end portion of the first link section. The second roller portion is aligned with and disposed on an outer side of the third roller in the axial direction. The second roller portion makes contact with a fourth end portion of the second link section. The forth end portion corresponds to an outer side part of the overlapped end portions of the second link members in the axial direction while the fourth end portion being overlapped with the third end portion when viewed in the axial direction. The spacer portion is disposed between the first roller portion and the second roller portion in the axial direction. The first roller portion, the second roller portion, and the spacer portion are formed as an integral unit. The second roller is configured and arranged to rotate independently from the first roller and the third roller.

According to the crawler-type travel device of the third aspect of the present invention, the first to third rollers are disposed while being allowed to rotate independently from each other. Therefore, when the first, second and third rollers respectively make contact with the first portion, the second and fourth end portions, and the third end portion, it is possible to inhibit abrasion to be caused in the abutment parts. Further, overall structure can be further simplified than the structure formed by more separate individual rollers.

A rotational wheel assembly according to a fourth aspect of the present invention is adapted to support and guide a crawler belt of a crawler-type travel device. The rotational wheel assembly includes a rotational wheel and a shaft. The shaft has an inner axial end and an outer axial end, and supports the rotational wheel while allowing it to rotate. The rotational wheel includes a first roller and a second roller. The first roller and the second roller are aligned in an axial direction of the shaft. The first roller and the second roller are configured and arranged to rotate independently from each other.

According to the rotational wheel assembly of the fourth aspect of the present invention, the first and second rollers are allowed to rotate independently from each other even if the first and second rollers are set to be in different roller-rotational conditions during travelling of the crawler-type travel device.

A rotational wheel assembly for a crawler-type travel device according to a fifth aspect of the present invention relates to the rotational wheel assembly of the fourth aspect of the present invention. The crawler-type travel device, provided with the rotational wheel assembly, includes a plurality of shoe plates and a plurality of link members. The link members are respectively attached to the shoe plates. The link members are coupled to each other at end portions thereof in an endless-loop shape. The end portions are overlapped when viewed in the axial direction of the shaft. The rotational wheel is configured to be rotated in conjunction with movement of the link members while making contact with the link members. The first roller makes contact with one side of the overlapped end portions of the link members in the axial direction, and the second roller makes contact with the other side of the overlapped end portions of the link members in the axial direction.

According to the rotational wheel assembly, the first and second rollers of the rotational wheel are aligned in the axial direction while being allowed to rotate independently from each other. Further, the first and second rollers are disposed in matched positions with the respective overlapped end portions disposed in the coupling part of the link members. Accordingly, when making contact with the link member, the first and second rollers are allowed to rotate independently form each other. The structure reduces abrasion to be caused in the abutment parts. Consequently, the rotational wheel assembly can reduce non-uniform abrasion on the rail surface of the link member.

A rotational wheel assembly for a crawler-type travel device according to a sixth aspect of the present invention includes a rotational wheel and a shaft. The rotational wheel includes a first roller, a second roller, and a third roller. The shaft with a rotational axis having an inner axial end and an outer axial end supports the rotational wheel while allowing the rotational wheel to rotate about the rotational axis. The first roller is disposed onto one end of the shaft on an outer side in a direction of the rotational axis. The first roller is supported by the shaft in a rotatable state. The third roller is disposed onto the other end of the shaft on an inner side in the direction of the rotational axis. The third roller is supported by the shaft in a rotatable state. The second roller includes a first roller portion, a second roller portion, and a spacer. The second roller is disposed between the first roller and the third roller. The second roller is configured and arranged to rotate about the shaft independently from the first roller and the third roller. The first roller portion of the second roller is disposed adjacent to an inner side of the first roller in the direction of the rotational axis. The second roller portion of the second roller is disposed adjacent to an outer side of the third roller in the direction of the rotational axis. The spacer portion is disposed between the first roller portion and the second roller portion. The spacer portion has a diameter smaller than diameters of outer peripheries of the first and second roller portions.

According to the rotational wheel assembly, the first roller and the first roller portion of the second roller, positioned adjacent to the first roller, are allowed to rotate independently from each other. Further, the third roller and the second roller portion of the second roller, positioned adjacent to the third roller, are allowed to rotate independently from each other. Therefore, even when these adjacent components are set to be in different roller-rotational conditions, they can properly cope with the conditions.

DETAILED DESCRIPTION OF EMBODIMENTS

First Embodiment

Structure

Figure 1:
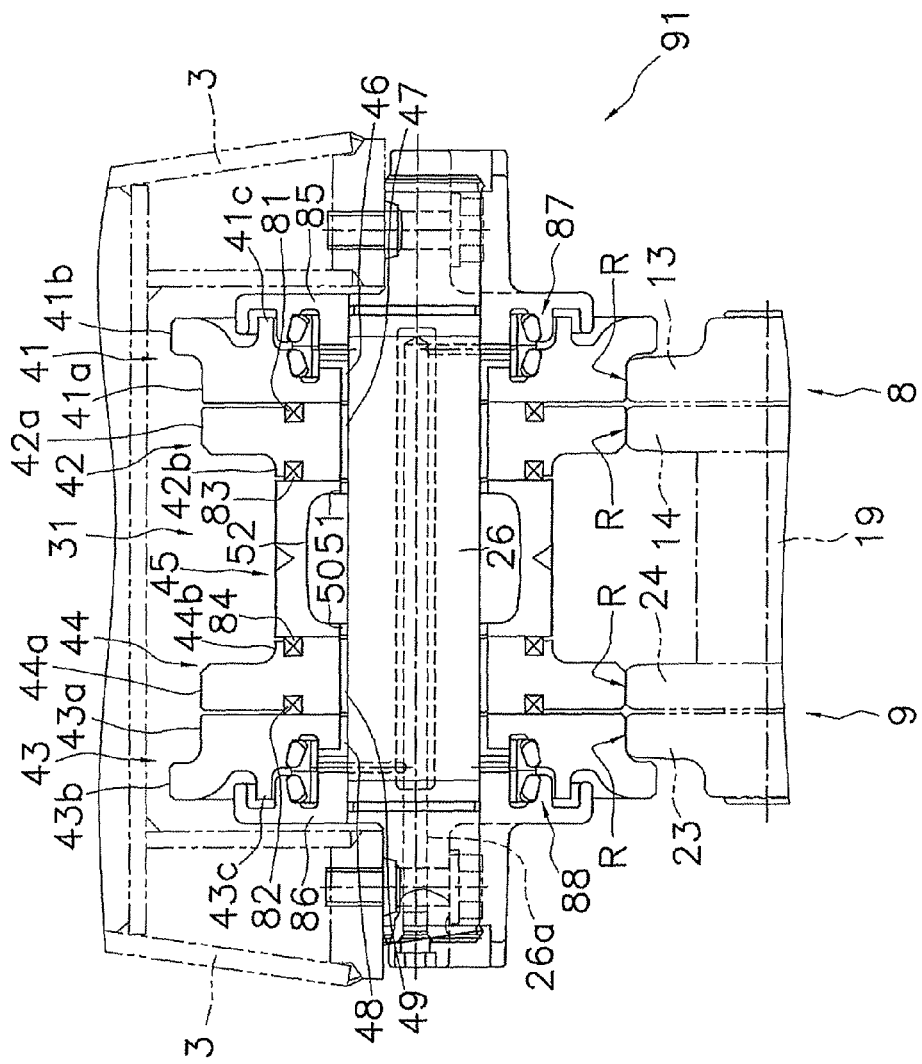
FIG. 1 is a cross-sectional view of a rotational wheel assembly according to a first exemplary embodiment.
Figure 4:
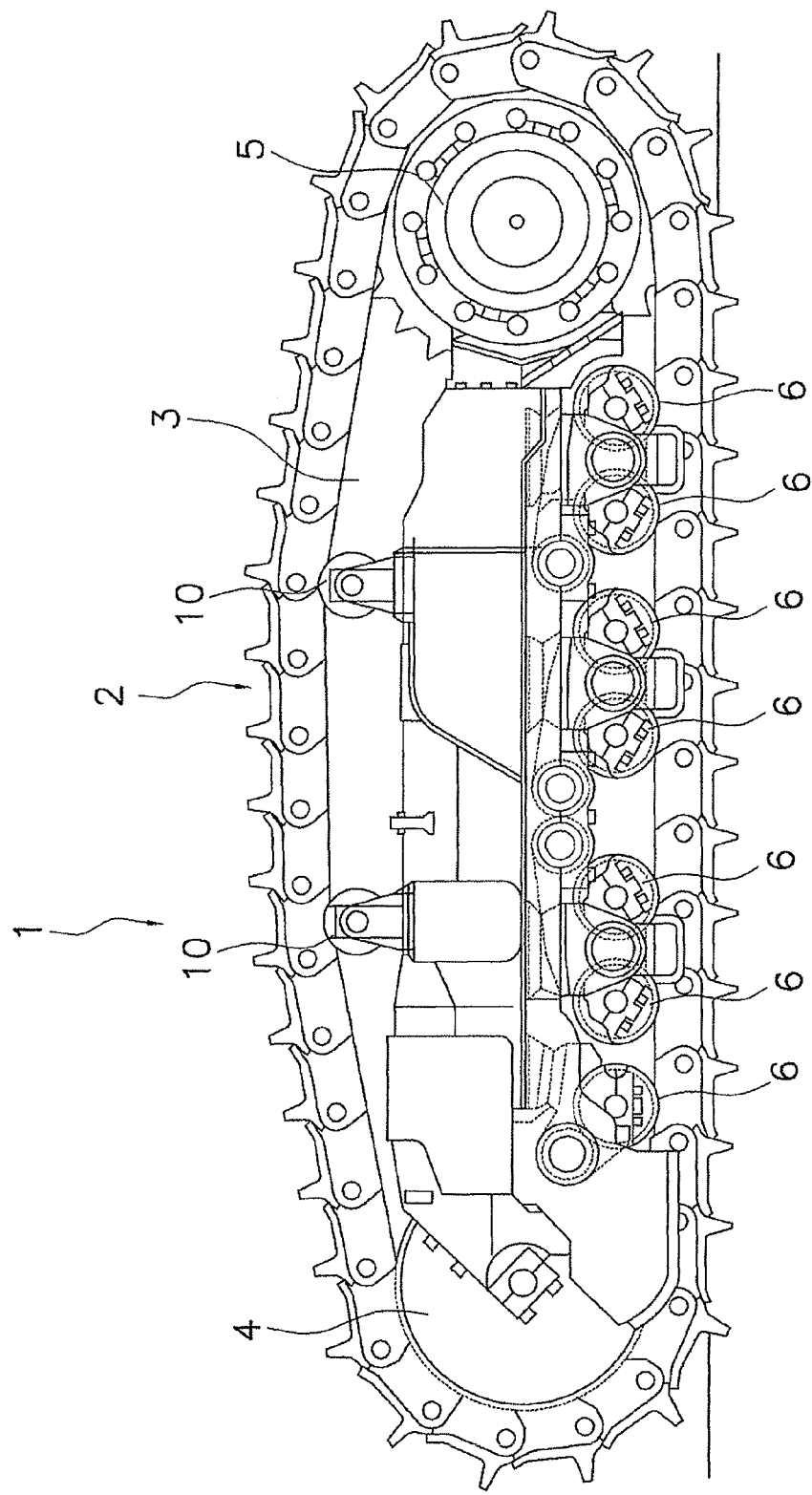
FIG. 4 is a side view of a crawler-type travel device.
Figure 5:
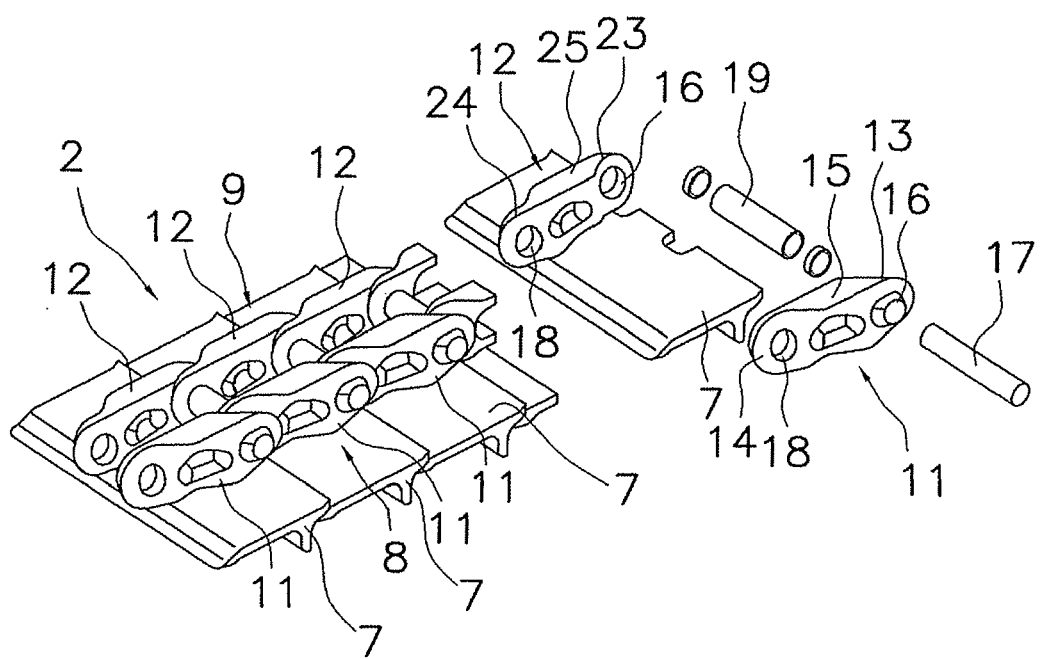
FIG. 5 is a perspective structural view of a crawler belt.
Figure 6A:
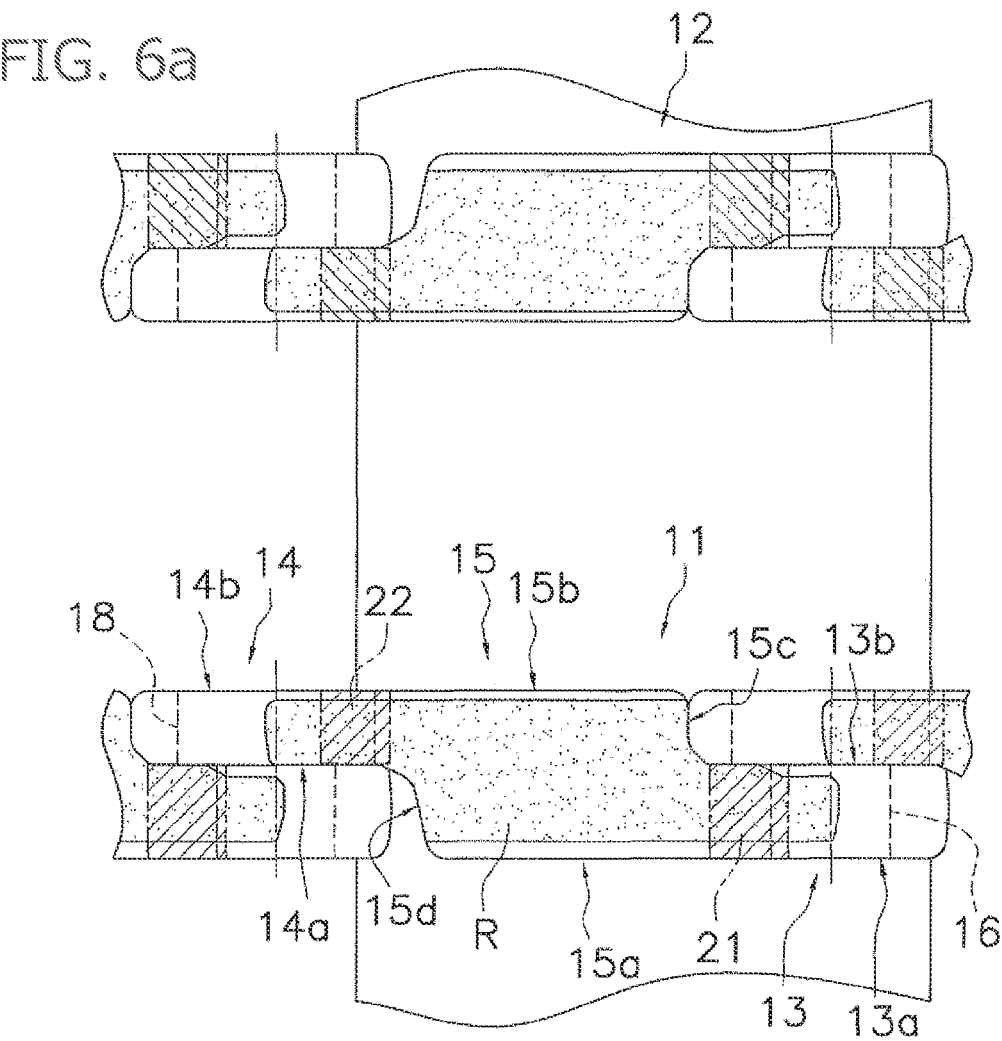
FIG. 6a and 6b are a plan view for illustrating rail surfaces of link members and a side view for illustrating a lateral surface of a link member.
Figure 6B:
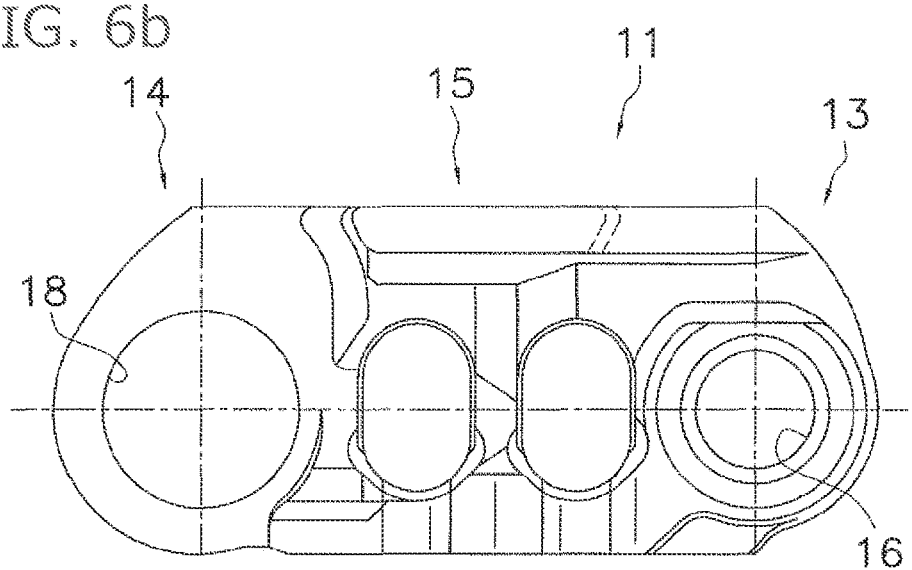

FIG. 1 illustrates a cross-sectional view of individual rotational wheel assemblies 91 provided in a crawler-type travel device according to an exemplary embodiment of the present invention. Each of the rotational wheel assemblies 91 is detachably attached to the foregoing track frame 3 (see FIG. 4) as a unit. Each of the rotational wheel assembly 91 includes a rotational wheel 31 and a shaft 26. The shaft 26 has an inner axial end and an outer axial end with respect to the vehicle. The rotational wheel assemblies 91 are mounted to positions of the bottom rotational wheels 6 illustrated in FIG. 4. Structures of other components of the crawler-type travel device (e.g., crawler belt 2) are approximately the same as those described above as a well-known art. Therefore, detailed description thereof will be hereinafter omitted for the sake of brevity.

The rotational wheel 31 of each rotational wheel assembly 91 is divided into plural roller segments in the axial direction. The roller segments are rotatable independently from each other. Specifically, the rotational wheel 31 includes a first roller 41, a second roller 42, a third roller 43, a fourth roller 44, and a spacer 45. The rollers 41-44 and the spacer 45 are independently rotatable with respect to the shaft 26. It should be noted that the directional terms such as "inner" and "outer" as used herein refer to such directions with respect to a vehicle assuming that the crawler-type travel device is mounted to the vehicle. For example, in a case shown in FIG. 1, the term "axial outer side" hereinafter refers to a position situated in the right side of FIG. 1 in a direction parallel to the rotation axis (i.e., longitudinal axis) of the shaft 26, and the term "axial inner side" hereinafter refers to a position situated in the left side of FIG. 1 in a direction parallel to the rotation axis of the shaft 26.

The rotational wheel 31 makes contact with a first link section 8 and a second link section 9. As described above, first link members 11 form the first link section 8, and a first end portion 13 of each of first link members 11 is overlapped with a second end portion 14 of an adjacent first link member 11 in the coupling part shared by them. The first end portion 13 is disposed on the axial outer side of the second end portion 14. On the other hand, the second end portion 14 is disposed in the axial inner side of the first end portion 13. Further, third end portions 23 of the second link section 9 are disposed symmetrical to the first end portions 13. Each of the third end portions 23 is disposed in the axial inner side of each of fourth ends 24 of the second link section 9. The fourth end portions 24 are disposed symmetrical to the second end portions 14. The fourth end portion 24 is disposed on the axial outer side of the third end portion 23.

The first roller 41 of each rotational wheel 31 is disposed in a position where it makes contact with the first end portion 13. The first roller 41 includes a first abutment portion 41a, a flange portion 41b, and a boss portion 41c. The first abutment portion 41a makes contact with the first end portion 13. The center axis of the first abutment portion 41a corresponds to the rotational axis of the shaft 26. Further, the first abutment portion 41a is a curved column having length approximately equal to width of the first end portion 13. The flange portion 41b is continuously formed with the axial outer side of the first abutment portion 41a. The flange portion 41b has diameter greater than that of the first abutment portion 41a. The outer periphery of the flange portion 41b is disposed on the axial outer side of the first link member 11 for preventing the first link member 11 from moving to the axial outer side. The boss portion 41c is formed on the outer surface of the flange portion 41b. Further, the first roller 41 includes a hole in its center part for allowing the shaft 26 to pass through. A bearing bushing 46 is fit into the hole, and the first roller 41 is supported by the shaft 26 through the bearing bushing 46 in a rotatable state.

The second roller 42 of each rotational wheel 31 is aligned with and disposed on the axial inner side of the first roller 41. The second roller 42 is rotatable independently from the first roller 41. The second roller 42 is disposed in a position where it makes contact with the second end portion 14. The second roller 42 includes a second abutment portion 42a and a small diameter portion 42b. The second abutment portion 42a has the same outer diameter as that of the first abutment portion 41a. The second abutment portion 42a makes contact with the second end portion 14. The center axis of the second abutment portion 42a corresponds to the rotation axis of the shaft 26. The second abutment portion 42a is a curved column having length approximately equal to width of the second end portion 14. The small diameter portion 42b is continuously formed with the axial inner side of the second abutment portion 42a. The small diameter portion 42b has outer diameter smaller than that of the second abutment portion 42a. Further, the second roller 42 includes a hole in its center part for allowing the shaft 26 to pass through. A bearing bushing 47 is fitted into the hole. The second roller 42 is supported by the shaft 26 through the bearing bushing 47 in a rotatable state. Further, the axial outer surface of the second roller 42 is contacted under pressure with the axial inner surface of the first roller 41, and a sealing member 81 is disposed between the axial outer surface of the second roller 42 and the axial inner surface of the first roller 41. Therefore, the first roller 41 and the second roller 42 can slide with each other while the inner space between them is constantly sealed.

The third roller 43 of each rotational wheel 31 is disposed away from the first roller 41 and the second roller 42 in the axial inner direction while making contact with the third end portion 23. The third roller 43 is formed symmetrical to the first roller 41 with respect to a plane perpendicular to the rotation axis of the shaft 26. The third roller 43 includes a third abutment portion 43a, a flange portion 43b, and a boss portion 43c. The individual portions 43a, 43b, 43c are formed in the same shapes as the corresponding portions of the first roller 41, excluding that the portions 43a, 43b, 43c are symmetrical to the corresponding portions of the first roller 41. Therefore, detailed description of the portions 43a, 43b, 43c will be hereinafter omitted for the sake of brevity. Further, the third roller 43 includes a hole in its center part for allowing the shaft 26 to pass through. A bearing bushing 48 is fitted into the hole. The third roller 43 is supported by the shaft 26 through the bearing bushing 48 in a rotatable state.

The fourth roller 44 of each rotational wheel 31 is aligned with and disposed on the axial outer side of the third roller 43. The fourth roller 44 is rotatable independently from the third roller 43. The fourth roller 44 is disposed in a position where it makes contact with the fourth end portion 24 of each of the second link members 12. The fourth roller 44 is formed in a symmetrical shape with the second roller 42 with respect to a plane perpendicular to the rotation axis of the shaft 26. The fourth roller 44 includes a fourth abutment portion 44a and a small diameter portion 44b. The individual portions 44a, 44b are formed in the same shapes as the corresponding portions of the second roller 42, excluding that the individual portions 44a, 44b are symmetrical to the corresponding portions of the second roller 42. Therefore, detailed description of the portions 44a, 44b will be hereinafter omitted for the sake of brevity. The fourth roller 44 includes a hole in its center part for allowing the shaft 26 to pass through. A bearing bushing 49 is fitted into the hole. The fourth roller 44 is supported by the shaft 26 through the bearing bushing 49 in a rotatable state. Further, the axial inner surface of the fourth roller 44 is contacted under pressure with the axial outer surface of the third roller 43, and a sealing member 82 is disposed between the axial inner surface of the fourth roller 44 and the axial outer surface of the third roller 43. Therefore, the third roller 43 and the fourth roller 44 can slide with each other while an inner space between them is constantly sealed.

The spacer 45 is axially disposed between the second roller 42 and the fourth roller 44. The spacer 45 is rotatable independently from the second roller 42 and the fourth roller 44. The outer diameter of the spacer 45 is less than outer diameters of the first to fourth abutment portions 41a-44a, but roughly the same as outer diameters of the small diameter portion 42b, 44b. Further, the spacer 45 is disposed in a position where it is opposed to bushings 19 coupling the first link members 11 and the second link members 12. The spacer 45 includes a hole in its center part for allowing the shaft 26 to pass through. Bearing bushings 50, 51 are fitted into the hole. The spacer 45 is supported by the shaft 26 through the bearing bushings 50, 51 in a rotatable state. The axial outer surface of the spacer 45 is contacted under pressure with the axial inner surface of the second roller 42, and a sealing member 83 is disposed between the axial outer surface of the spacer 45 and the axial inner surface of the second roller 42. Therefore, the spacer 45 and the second roller 42 can slide with each other while an inner space between them is constantly sealed. Further, the axial inner surface of the spacer 45 is contacted under pressure with the axial outer surface of the fourth roller 44, and a sealing member 84 is disposed between the axial inner surface of the spacer 45 and the axial outer surface of the fourth roller 44. Therefore, the spacer 45 and the fourth roller 44 can slide with each other while an inner space between them is constantly sealed.

Further, the foregoing first to fourth rollers 41-44 and the spacer 45 are prevented from axially moving by a first collar member 85 and a second collar member 86. Specifically, the first to fourth rollers 41-44 and the spacer 45 are disposed between and held by the first collar member 85 and the second collar member 86 while making contact with each other. The first collar member 85 includes a hole for allowing the shaft 26 to be inserted and fitted thereto. The first collar member 85 is disposed on the axial outer side of the axial outer surface of the first roller 41 for covering the boss portion 41c of the first roller 41. A first floating seal 87 is disposed between the first collar member 85 and the first roller 41. Accordingly, the first roller 41 can rotate with respect to the first collar member 85 while the inside of the first roller 41 is constantly sealed. On the other hand, the second collar member 86 has a hole for allowing the shaft 26 to be inserted and fitted thereto. The second collar member 86 is disposed on the axial inner side of the axial inner surface of the third roller 43 for covering the boss portion 43c of the third roller 43. A second floating seal 88 is disposed between the second collar member 86 and the third roller 43. The third roller 43 can rotate with respect to the second collar member 86 while the inside of the third roller 43 is constantly sealed.

The shaft 26 includes an oil filler opening 26a in its inside. Lubricating oil is supplied to the bearing surfaces of the bearing bushings 46-51 from the outside of the shaft 26 through the oil filler opening 26a. Further, the spacer 45 includes a recess 52 in the axial intermediate part of the hole formed in the center part of the spacer 45. The recess 52 is dented in the radial outward direction. The recess 52 functions as an oil container where the foregoing lubricating oil is contained after being supplied through the oil filler opening 26a. Further, the both ends of the shaft 26 are respectively protruded from the first collar member 85 and the second collar member 86. The both ends are secured to the bottom parts of the track frame 3, and accordingly each rotational wheel assembly 91 is attached to the crawler-type travel device.

Figure 7:
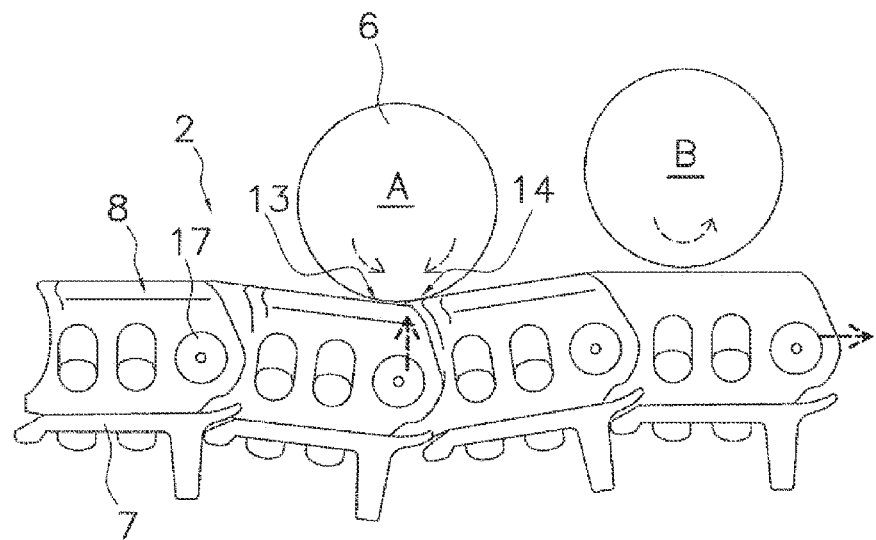
FIG. 7 is a side view of the rotational wheel assembly or the crawler-type travel device in a traveling state.
Figure 8:
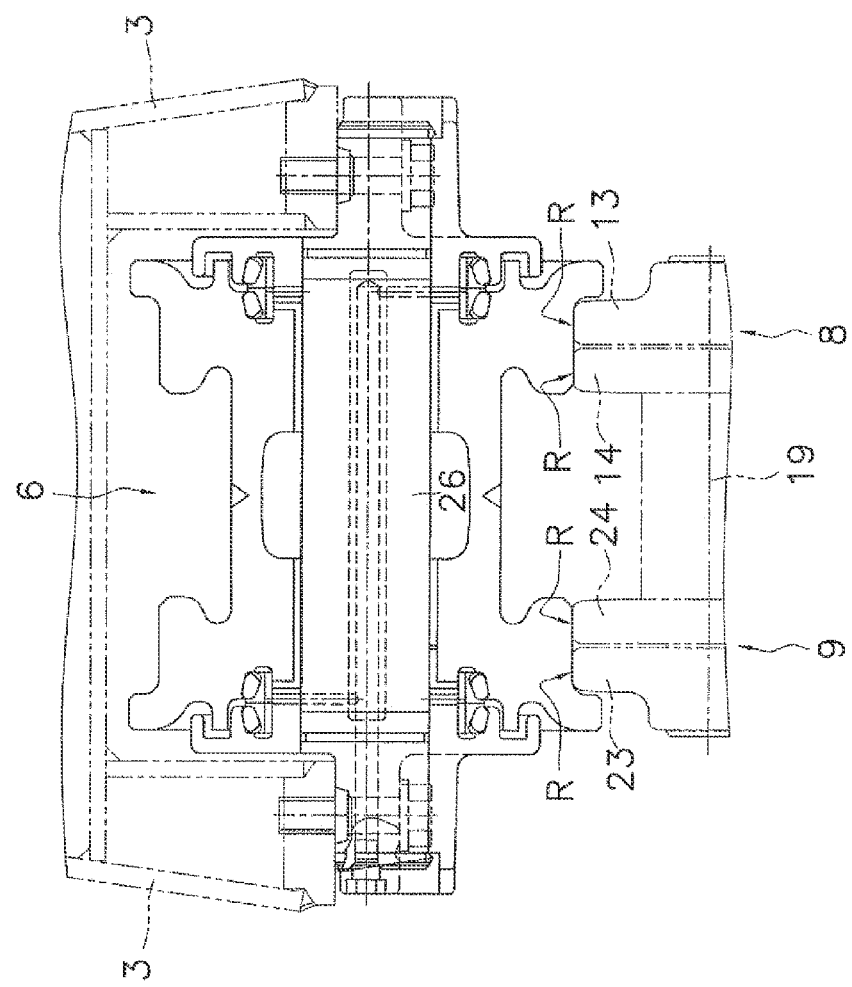
FIG. 8 is a cross-sectional view of a well-known rotational wheel assembly.

Next, functions of each rotational wheel assembly 91 will be hereinafter explained. When each bottom rotational wheel 6 and the first link section 8 make contact with each other, their positional relation is classified into two types of A and B illustrated in FIG. 7.

In the positional relation B, the bottom rotational wheel 6 makes contact with a wide intermediate portion 15 of a rail surface R of the first link member 11 forming a part of the first link section 8. When a crawler belt 2 herein moves from left to right in FIG. 7, for instance, the bottom rotational wheel 6 turns over on the rail surface R while rotating in the counter-clockwise direction.

In the positional relation A, on the other hand, the bottom rotational wheel 6 makes contact with the narrow first end portion 13 and the second end portion 14 of the rail surface R. In other words, the bottom rotational wheel 6 herein makes contact with the coupling part of the first link section 8 and/or its vicinity. In this case, the bottom rotational wheel 6 receives not only a rotational force element to be produced in response to left-and-right movement of the crawler belt 2, but also a rotational force element to be produced in response to up-and-down bending of the coupling part of the first link section 8. For example, when being moved upward from a separate position from the bottom rotational wheel 6, the coupling part of the first link section 8 makes contact with the bottom rotational wheel 6 and the first link section 8 is accordingly bent. In this case, rotational force in the counter-clockwise direction is applied to a part, making contact with the first end portion 13, of the bottom rotational wheel 6. Simultaneously, rotation force in the clockwise direction is applied to a part, making contact with the second end portion 14, of the bottom rotational wheel 6. In the well-known bottom rotational wheel, the bottom rotational wheel, as a single member, includes both an abutment part for making contact with the first end portion 13 and an abutment part for making contact with the second end portion 14. For example, when the bottom rotational wheel herein rotates in response to force to be applied to the abutment part for making contact with the first end portion 13, the abutment part for making contact with the second end portion 14 rotates faster than rotation in response to force to be applied by the first link section 8. In other words, movement of the first link section 8 and that of the bottom rotational wheel 6 are not matched at the abutment point between the bottom rotational wheel 6 and the second end portion 14. Therefore, the bottom rotational wheel 6 slides on the rail surface R of the first link section 8. Generally speaking, the amount of abrasion due to slide is significantly greater than that due to rotation under a condition where constant load is applied on the abutment part. Thus, the foregoing non-uniform abrasion has been caused on the rail surface R.

As described above, in the rotational wheel assembly 91 of the present exemplary embodiment, the abutment portion to the first end portion 13 and that to the second end portion 14 are rotatable independently from each other. Therefore, the foregoing slide phenomenon is prevented on the rail surface R of the bottom rotational wheel 6 in the positional relation A. Consequently, rotational abrasion, resulting smaller amount of abrasion than slide abrasion, will be caused on the entire rail surface R. In other words, non-uniform abrasion can be prevented on the rail surface R.

Features

In the rotational wheel assembly 91 of the present exemplary embodiment, the rotational wheel 31 is divided into the first to fourth rollers 41-44 and the spacer 45, and these components are rotatable relative to each other. Therefore, when the first to fourth rollers 41-44 make contact with the first and second end portions 13, 14 of the first link section 8 and the third and fourth end portions 23, 24 of the second link section 9, the first to fourth rollers 41-44 can rotate in response to movement of the end portions. Accordingly, abrasion can be inhibited in the abutment parts. Even when structures and/or behaviors of the first and second end portions 13, 14 of the first link section 8 and the third and fourth end portions 23, 24 of the second link section 9 are different from each other, for instance, when the first to fourth end portions 13, 14, 23, 24 make contact with the first to fourth rollers 41-44 at different inclination angles and the first to fourth rollers 41-44 are accordingly configured to rotate different speeds, relative rotation of the first to fourth rollers 41-44 can relieve influence of the behavioral differences among the end portions. Further, each of the rollers 41-44 has lighter weight than the well-known undivided rotational wheel. Therefore, it is possible to inhibit abrasion at the abutment parts.

Overall, according to the rotational wheel assembly 91 and the crawler-type travel device provided with it, it is possible to reduce non-uniform abrasion on the rail surfaces R of the link members 11, 12. In other words, it is possible to reduce formation of recesses on the abutment parts.

Second Embodiment

Structure

Figure 2:
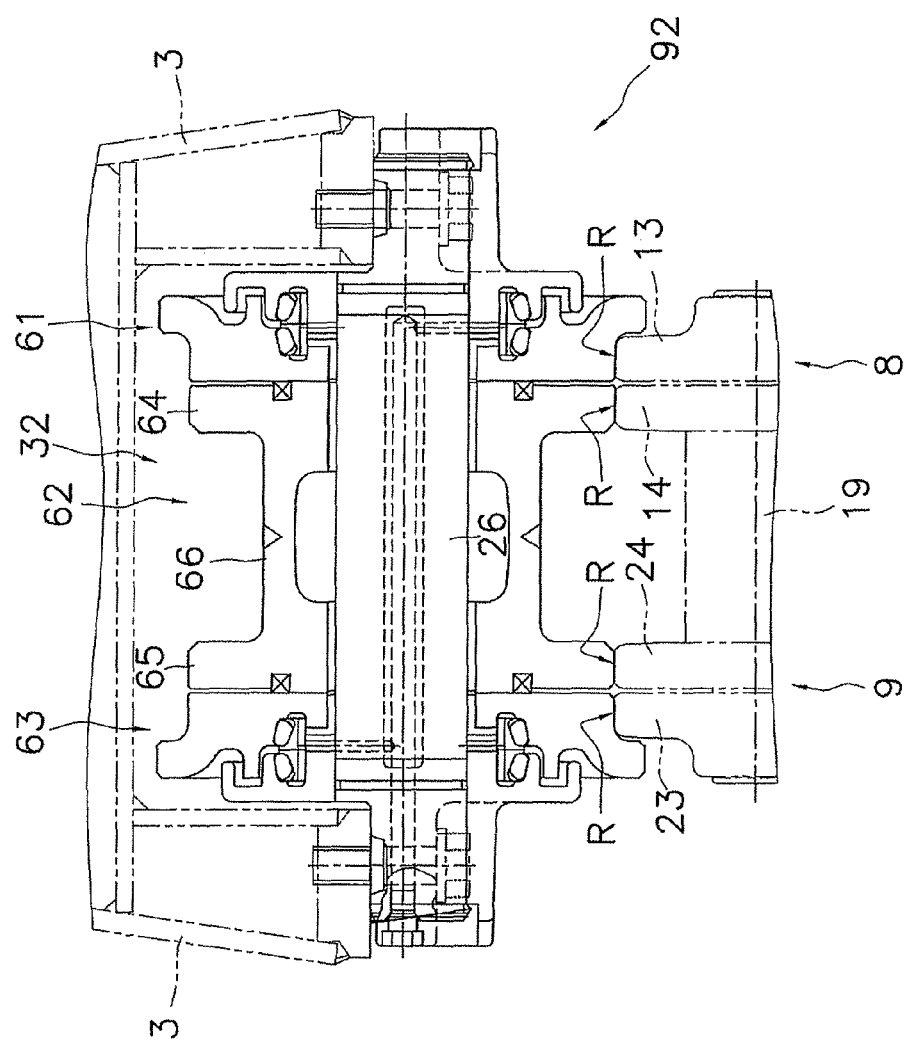
FIG. 2 is a cross-sectional view of a rotational wheel assembly according to a second exemplary embodiment.

FIG. 2 illustrates a cross-sectional view of each of rotational wheel assemblies 92 provided in a crawler-type travel device according to a second exemplary embodiment of the present invention. Each rotational wheel assembly 92 includes a rotational wheel 32 and the shaft 26. The shaft 26 is the same as that of the first exemplary embodiment. The rotational wheel 32 includes a first roller 61, a second roller 62, and a third roller 63. The first roller 61, the second roller 62, and the third roller 63 are formed as separate individual components.

The first roller 61 of each rotational wheel 32 has the same structure as the first roller 41 of the first exemplary embodiment. The first roller 61 is disposed in a position where it makes contact with the first end portion 13.

The third roller 63 of each rotational wheel 32 has the same structure as the third roller 43 of the first exemplary embodiment. The third roller 63 is disposed in a position where it makes contact with the third end portion 23.

The second roller 62 of each rotational wheel 32 is an intermediate roller disposed between the first roller 61 and the third roller 63. The second roller 62 is rotatable independently from the first roller 61 and the third roller 63. The second roller 62 includes a first roller portion 64, a second roller portion 65, and a spacer portion 66.

The first roller portion 64 has the same structure as the second roller 42 of the first exemplary embodiment. The first roller portion 64 is disposed in a position where it makes contact with the second end portion 14. The second roller portion 65 has the same structure as the fourth roller 44 of the first exemplary embodiment. The second roller portion 65 is disposed in a position where it makes contact with the fourth end portion 24. The spacer portion 66 has the same structure as the spacer 45 of the first exemplary embodiment. The spacer portion 66 is positioned between the first roller portion 64 and the second roller portion 65. In should be herein noted that the first roller portion 64, the second roller portion 62, and the spacer portion 66 are formed as an integral unit and accordingly rotate about the shaft 26 as a single component.

The other structures of the rotational wheel 32 are the same as those of the rotational wheel 31 of the first exemplary embodiment.

Features

In the rotational wheel assembly 92, the rotational wheel 32 is divided into the first to third rollers 61-63. Further, the first to third rollers 61-63 are rotatable independently from each other. Therefore, when the first to third rollers 61-63 make contact with the first to fourth end portions 13, 14, 23, 24, the first to third rollers 61-63 are allowed to rotate independently from each other. Accordingly, it is possible to inhibit abrasion to be caused at the abutment parts. For example, even when the first and second end portions 13, 14 of the first link section 8 respectively make contact with the first and second rollers 61, 62 in different behaviors, the first roller 61 and the second roller 62 are allowed to rotate independently from each other. Accordingly, it is possible to relieve influence of the behavioral difference of the end portions. This is true to the case that the third and fourth end portions 23, 24 of the second link section 9 respectively make contact with the second and third rollers 62, 63 in different behaviors. Further, each of the rollers 61-63 has lighter weight than the well-known undivided rotational wheel. Therefore, it is possible to inhibit abrasion at the abutment parts.

Overall, according to the rotational wheel assembly 92 and the crawler-type travel device provided with it, it is possible to reduce non-uniform abrasion on the rail surfaces R of the link members 11, 12. In other words, it is possible to reduce formation of recesses on the abutment parts.

Third Embodiment

Structure

Figure 3:
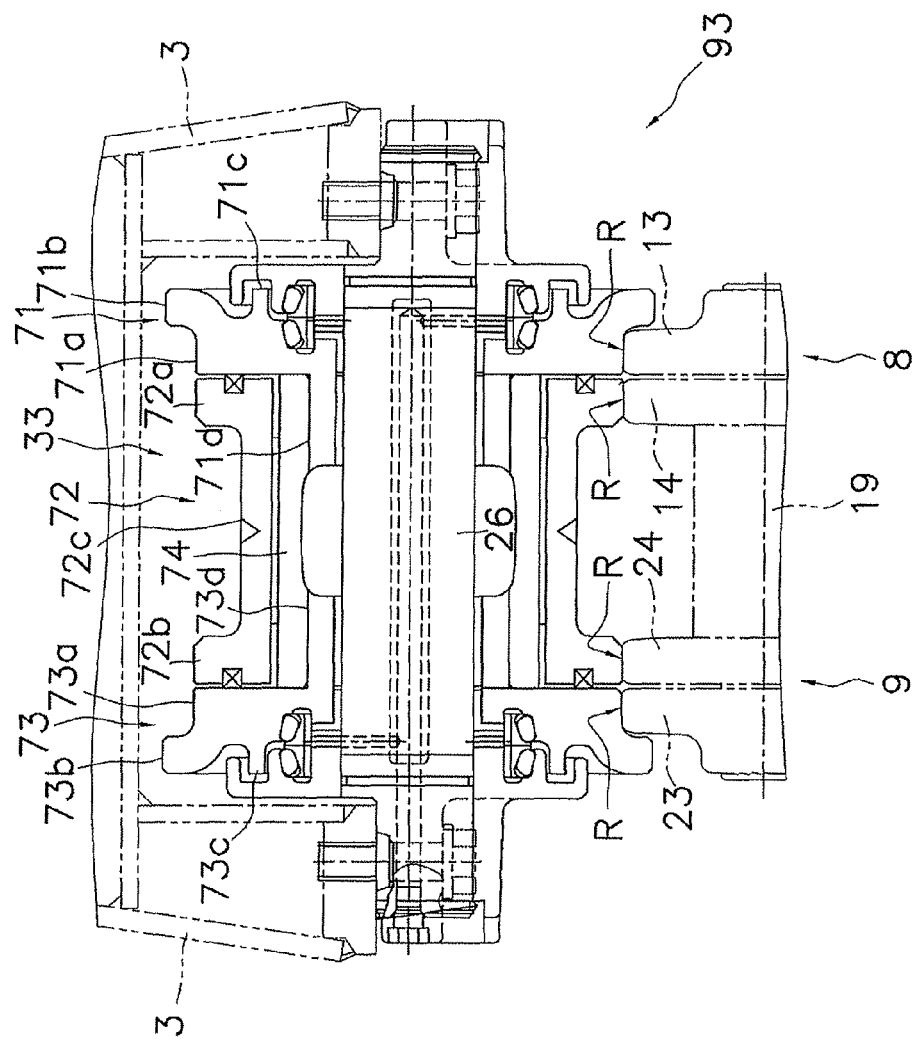
FIG. 3 is a cross-sectional view of a rotational wheel assembly according to a third exemplary embodiment.

FIG. 3 illustrates a cross-sectional view of each of rotational wheel assemblies 93 provided in a crawler-type travel device according to a third exemplary embodiment of the present invention. Each rotational wheel assembly 93 includes the shaft 26 and a rotational wheel 33 configured to rotate about the shaft 26. The shaft 26 is the same as that of the first exemplary embodiment. The rotational wheel 33 includes a first roller 71, a second roller 72, a third roller 73, and a bushing 74. The first roller 71 and the third roller 73 are integrally formed through the bushing 74. The first roller 71 and the third roller 73 form an end roller. The second roller 72 is an intermediate roller disposed between the first roller 71 and the third roller 73.

The first roller 71 is disposed onto one end of the shaft 26 (i.e., the axial outer end of the shaft 26) while the outer periphery of the first roller 71 makes contact with the first end portion 13 of the first link member 8. The first roller 71 includes a first abutment portion 71a, a flange portion 71b, a boss portion 71c, and press-fit portion 71d. The first abutment portion 71a, the flange portion 71b, and the boss portion 71c are respectively the same as the first abutment portion 41a, the flange portion 41b, and the boss portion 41c of the first exemplary embodiment. The press-fit portion 71d is a cylindrical portion having diameter smaller than that of the first abutment portion 71a. The press-fit portion 71d is protruded from the axial inner surface of the first abutment portion 71a in the axial inner direction.

The third roller 73 is disposed onto the other end of the shaft 26 (i.e., the axial inner end of the shaft 26) while the outer periphery of the third roller 73 makes contact with the third end portion 23 of the first link member 8. The third roller 73 has the same structure as the first roller 71. The third roller 73 includes a third abutment portion 73a, a flange portion 73b, a boss portion 73c, and a press-fit portion 73d. The third abutment portion 73a, the flange portion 73b, and the boss portion 73c are respectively the same as the third abutment portion 43a, the flange portion 43b, and the boss portion 43c of the first exemplary embodiment. The press-fit portion 73d is a cylindrical portion having diameter smaller than that of the third abutment portion 73a. The press-fit portion 73d has the same diameter as that of the press-fit portion 71d of the first roller 71. The press-fit portion 73d is protruded from the axial outer surface of the third abutment portion 73a in the axial outer direction.

The bushing 74 is a cylindrical member. The press-fit portion 71d of the first roller 71 is fixed into the axial outer part of the inner periphery of the bushing 74 by means of press-fitting, whereas the press-fit portion 73d of the third roller 73 is fixed into the axial inner part of the inner periphery of the bushing 74 by means of press-fitting. Further the shaft 26 is inserted into the inner periphery of the press-fit portions 71d, 73d fixed into the bushing 74. Under the condition, the press-fit portions 71d, 73d are rotatable with respect to the shaft 26. Thus, the first roller 71 and the third roller 73 are integrally formed through the bushing 74 and form the end roller.

The second roller 72 (intermediate roller) is rotatable independently from the first and third rollers 71, 73 of the end roller. The second roller 72 includes a first roller portion 72a, a second roller portion 72b, and a spacer portion 72c. The first roller portion 72a, the second roller portion 72b, and the spacer portion 72c are herein respectively the same as the first roller portion 64, the second roller portion 65, and the spacer portion 66 of the second exemplary embodiment. The first roller portion 72a, the second roller portion 72b, and the spacer portion 72c are formed as an integral unit. It should be noted that the second roller 72 is disposed onto the outer periphery of the bushing 74 in a rotatable state.

The other structures of the rotational wheel 33 are the same as those of the rotational wheel 31 of the first exemplary embodiment and the rotational wheel 32 of the second exemplary embodiment.

Features

In the rotational wheel assembly 93, the rotational wheel 33 is divided into the first roller 71, the third roller 73, and the second roller 72. The rollers 71-73 are rotatable independently from each other. Therefore, the rotational wheel assembly 93 can achieve the same advantageous effects as the rotational wheel assembly 92 of the second embodiment. Specifically, it is possible to reduce non-uniform abrasion on the rail surfaces R of the link members 11, 12. In other words, it is possible to reduce formation of recesses on the abutment parts. Further, the first roller 71 and the third roller 73, disposed on the both axial ends of the rotational wheel 33, are formed as an integral end roller. It is therefore possible to reduce load to be applied to a sealing member.

Other Embodiments

In the foregoing exemplary embodiment, the present invention has been applied to the bottom rotational wheels. However, the present invention can be similarly applied to a top rotational wheel 10 and an idler tumbler 4.

Further, the present invention can be applied to both the bottom rotational wheels configured to pivot up and down with respect to the track frame and the bottom rotational wheels fixed to the track frame while being prevented from pivoting up and down. Moreover, in the end roller of the third exemplary embodiment, the first roller 71 and the third roller 73 are integrally formed through the bushing 74. However, the first roller 71 and the third roller 73 may be integrally formed by means of press-fitting without any intervening component.

Yet further, the shape of the link member is not limited to the above. For example, the foregoing abrasion problem is possibly caused by any type of link members as long as they are coupled to each other at their end portions while the coupled end portions are overlapped in the axial direction. Therefore, the present invention is also effective for the link member of the type.

The above illustrated embodiments have an advantageous effect of reducing non-uniform abrasion on the rail surface of a link member, and are therefore useful as a crawler-type travel device and a rotational wheel assembly.

The invention claimed is:

1. A crawler-type travel device comprising:
   a plurality of shoe plates;
   a first link section coupling the shoe plates in an endless loop shape;
   a rotational wheel configured to be rotated in conjunction with movement of the first link section while making contact with the first link section; and
   a shaft having an inner axial end and an outer axial end, and supporting the rotational wheel while allowing the rotational wheel to rotate with respect to the shaft,
   the first link section including a plurality of first link members with the first link members being respectively attached to the shoe plates, the first link members being coupled to each other at end portions thereof while the end portions of the first link members are overlapped when viewed in an axial direction of the shaft, and
   the rotational wheel including
      a first roller making contact with a first end portion of the first link section corresponding to an outer side part of the overlapped end portions of the first link members in the axial direction, and
      a second roller aligned with and disposed on an inner side of the first roller in the axial direction, the second roller being configured and arranged to rotate independently from the first roller, the second roller making contact with a second end portion of the first link section corresponding to an inner side part of the overlapped end portions of the first link members in the axial direction with the second end portion being overlapped with the first end portion when viewed in the axial direction.

2. The crawler-type travel device according to claim 1, further comprising
a second link section inwardly spaced apart from the first link section in the axial direction, the second link section including a plurality of second link members with the second link members being respectively attached to the shoe plates, the second link members being coupled to each other at end portions thereof while the end portions are overlapped when viewed in the axial direction of the shaft,
the rotational wheel further including
a third roller making contact with a third end portion of the second link section corresponding to an inner side part of the overlapped end portions of the second link member in the axial direction,
a fourth roller aligned with and disposed on an outer side of the third roller in the axial direction, the fourth roller being configured and arranged to rotate independently from the third roller, the fourth roller making contact with a fourth end portion of the second link section an outer side part of the overlapped end portions of the second link members in the axial direction with the second end portion being overlapped with the third end portion when viewed in the axial direction, and
a spacer disposed between the second roller and the fourth roller in the axial direction, the spacer being configured and arranged to rotate independently from the second roller and the fourth roller.

3. The crawler-type travel device according to claim 1, further comprising
a second link section inwardly spaced apart from the first link section in the axial direction, the second link section including a plurality of second link members with the second link members being respectively attached to the shoe plates, the second link members being coupled to each other at end portions thereof while the end portions are overlapped when viewed in the axial direction of the shaft,
the rotational wheel further including a third roller making contact with a third end portion of the second link section corresponding to an inner side part of the overlapped end portions of the second link members in the axial direction,
the second roller including
a first roller portion aligned with and disposed on an inner side of the first roller in the axial direction, the first roller portion making contact with the second end portion of the first link section;
a second roller portion aligned with and disposed on an outer side of the third roller in the axial direction, the second roller portion making contact with a fourth end portion of the second link section corresponding to an outer side part of the overlapped end portions of the second link members in the axial direction with the fourth end portion being overlapped with the third end portion when viewed in the axial direction, and
a spacer portion disposed between the first roller portion and the second roller portion in the axial direction,
the first roller portion, the second roller portion, and the spacer portion being formed as an integral unit, and
the second roller being configured and arranged to rotate independently from the first roller and the third roller.

4. A rotational wheel assembly adapted to support and guide a crawler belt of a crawler-type travel device, the rotational wheel assembly comprising:
a rotational wheel; and
a shaft having an inner axial end and an outer axial end, and supporting the rotational wheel while allowing the rotational wheel to rotate with respect to the shaft, and
the rotational wheel including a first roller and a second roller with the first roller and the second roller being aligned in an axial direction of the shaft, the first roller and the second roller being configured and arranged to rotate independently from each other, wherein
the rotational wheel is configured and arranged to be rotated in conjunction with movement of a plurality of link members respectively attached to a plurality of shoe plates with the link members being coupled to each other at end portions thereof in an endless-loop shape with the end portions being overlapped when viewed in the axial direction of the shaft,
the first roller is configured and arranged to make contact with one side of the overlapped end portions of the link members in the axial direction, and
the second roller is configured and arranged to make contact with the other side of the overlapped end portions of the link members in the axial direction.

5. A rotational wheel assembly for a crawler-type travel device, comprising:
a rotational wheel including a first roller, a second roller, and a third roller; and
a shaft with a rotational axis having an inner axial end and an outer axial end, the shaft supporting the rotational wheel while allowing the rotational wheel to rotate about the rotational axis,
the first roller being disposed onto one end of the shaft on an outer side in a direction of the rotational axis, the first roller being supported by the shaft in a rotatable state,
the third roller being disposed onto the other end of the shaft on an inner side in the direction of the rotational axis, the third roller being supported by the shaft in a rotatable state,
the second roller including a first roller portion, a second roller portion, and a spacer, the second roller being disposed between the first roller and the third roller, the second roller being configured and arranged to rotate about the shaft independently from the first roller and the third roller,
the first roller portion of the second roller being disposed adjacent to an inner side of the first roller in the direction of the rotational axis,
the second roller portion of the second roller being disposed adjacent to an outer side of the third roller in the direction of the rotational axis, and
the spacer portion being disposed between the first roller portion and the second roller portion, the spacer portion having a diameter smaller than diameters of outer peripheries of the first and second roller portions.

* * * * *